Patented July 12, 1927.

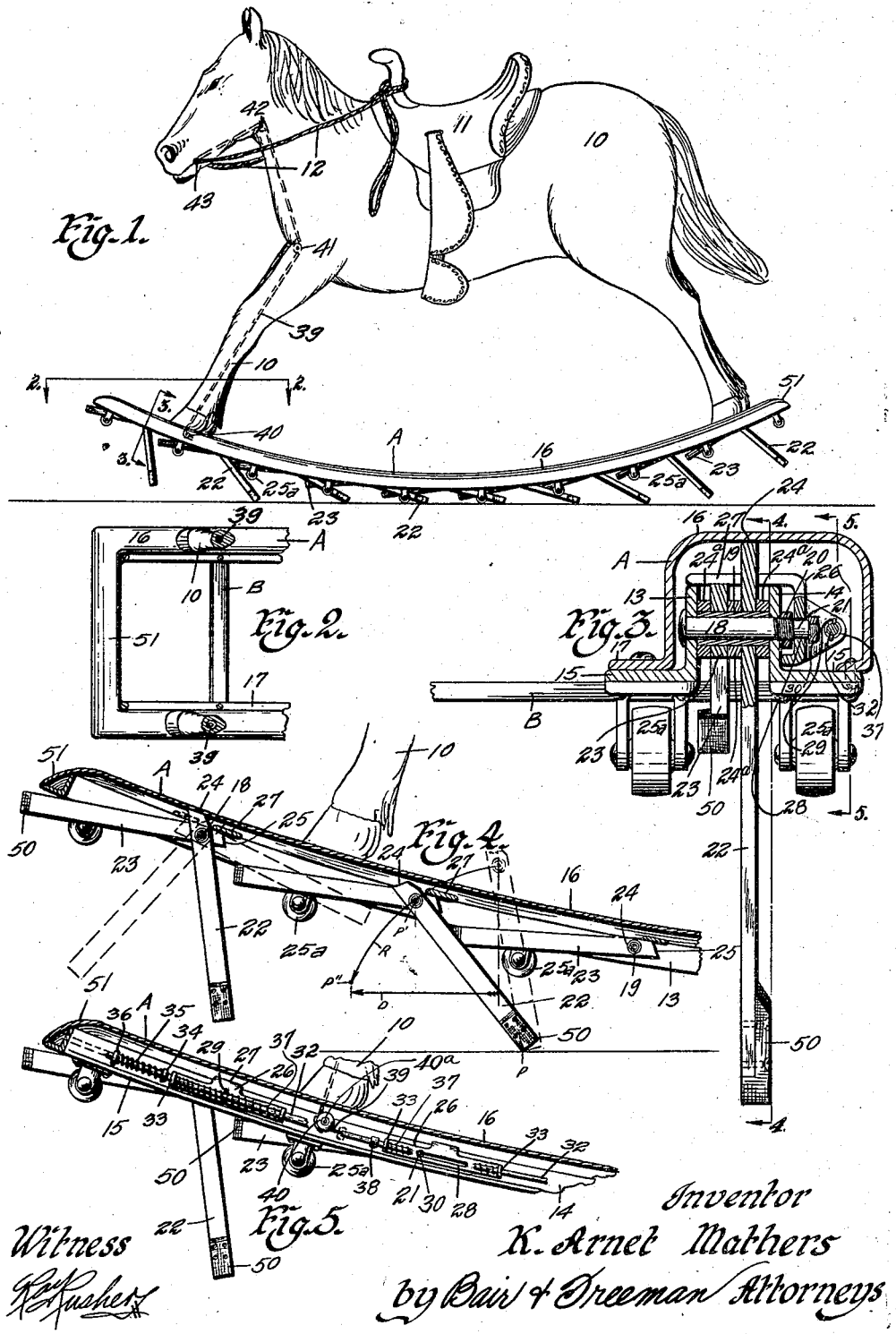

1,635,375

UNITED STATES PATENT OFFICE.

KENNETH ARNET MATHERS, OF HASKINS, IOWA.

AMUSEMENT DEVICE.

Application filed October 13, 1924. Serial No. 743,383.

My purpose in my invention is to provide an amusement device of the type which may be ridden, as for instance, by a child, and which may be rocked for thereby advancing the device over the ground.

A further purpose is to provide in such a device, means whereby the rocking horse or the like may be advanced or moved backwardly in a straight or curved line.

A further purpose is to provide pivoted means for effecting the advancing or backward movement of the device, and means for controlling said pivoted means for effecting the movement in the direction desired.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a side elevation of an amusement device embodying my invention.

Figure 2 is a horizontal sectional view taken on the line 2—2 of Figure 1.

Figure 3 is a detailed, sectional view taken on the line 3—3 of Figure 1.

Figure 4 is a sectional view taken on the line 4—4 of Figure 3; and

Figure 5 is a sectional view taken on the line 5—5 of Figure 3.

In the accompanying drawings, I have used the reference numeral 10 to indicate generally the body of the device which may have a great variety of shapes and forms.

In the particular form of invention here illustrated, I have shown a body 10 in the shape of a hobby horse with the saddle 11 and bridle reins 12.

The body 10 is supported on a pair of laterally spaced rockers indicated generally in Figure 1 by the reference character A.

Each rocker comprises a pair of spaced angle bars 13 and 14 having vertical flanges spaced from each other and laterally extended angles or flanges 15.

Each rocker is preferably covered by a downwardly opening channel shaped member 16, having at the sides laterally projecting flanges 17, which may be screwed or bolted to the flanges 15, as shown in Figure 3.

The cover channel 16 serves to enhance the appearance of the device and also to give greater rigidity to the rockers.

For effecting the movement of the device across the floor or ground, I provide the following means.

Extended through the vertical flanges 13 and 14 at regularly spaced intervals from front to rear of the device, I have provided shafts 18. On each shaft 18 between the adjacent flanges 13 and 14 is a spacer sleeve 19.

On one end of each shaft 13 adjacent the outer surface of the flange 14, for instance, is screwed a nut 20.

Beyond the nut 20 each shaft 18 is provided with a reduced spindle 21, all as shown in Figure 3.

The purpose of the spindle 21 will be referred to again.

Pivotally hung on each shaft 18 are two bars 22 and 23, which for convenience, I will call walking feet.

Referring now to the walking feet 22 and 23, it will be noted that the foot 22 has a beveled edge, as at 24, so arranged as to engage the under side of the cover channel 16 when the lower part of the foot 22 is swung forwardly, at such a point that the lower part of the foot 22 never reaches position at right angles to the channel cover 16, but is always inclined rearwardly with relation thereto.

Each foot 23 has a similar beveled upper edge 25 shaped and arranged to engage the under surface of the channel cover 16 at such a point that the foot 23 is always inclined forwardly from the shaft 18 on which it is pivoted, toward its lower end with relation to the channel cover 16. The feet 22 and 23 are provided with rubber ends 50 for better engaging a floor or the like.

Spacer washers 24$^a$ are arranged between the feet 22 and 23 on the shafts 18 and between the feet and the flanges 13 and 14, as shown in Figure 3.

Mounted below the flanges 15 are small rollers 25$^a$.

For determining whether the feet 22 or 23 shall be operated when the device is rocked and for retaining the other set of feet inoperative, I have provided the following means.

Mounted upon each of the spindles 21 of the shafts 18 is an upright elongated bar 26 having a central part, a member 27 overhanging the flanges 13 and 14, as shown.

The spindle 21 is received in a longitudinally elongated slot 28 in the bar 26 in order to permit sliding movement of the bar 26.

On the end of the spindle 21 is screwed a nut 30 which holds the bar 26 on the spindle.

The bars 26 are each provided with laterally projecting ears 33.

Rods 32 are extended through the ears 33.

The rods 32 are curved to conform to the general shape of the rocker.

The legs 22 and 23 and the overhanging members 27 are so arranged that when the members 27 are at their rearward limit of movement, the upper forward edges of the legs 23 are engaged by the members 27, which for convenience, I will call shifters, in such manner as shown in Figure 4, that the feet 23 are held tilted forwardly and upwardly so as to be inoperative when the device is rocked.

When the shifters 27 are in the position mentioned, they also serve to limit the swinging movement of the feet 23 by engaging the rearward upper edges thereof, serving in this respect and in this position of the parts substantially the same function as the channel cover 16.

At the forward ends of the rods 32 are collars 34.

Springs 35 are arranged between the collars 34 and collars 36 fixed to the flange 14 for normally yieldingly holding the rods 32 at their rearward limit of movement.

The rods 32 between each pair of ears 33 have stops or pins 29.

Springs 37 are arranged on the rods 32 between the stops 29 and the ears 33.

For advancing the rods 32 forwardly against the tension of the springs 35, the following means are provided.

Such means, generally speaking, comprise flexible members extended around suitable guides to position convenient of access by the user or rider of the device.

Each rod 32 has a collar or the like 38 thereon.

A flexible cord or chain or the like 39 (see Figure 5), is secured to the collar 38 and extended forwardly around a guide pulley or the like 40, thence upwardly, as illustrated in dotted lines. The pulley 40 is rotatably mounted on a pin 40ª which is secured to the vertical flange of the angle 14 as clearly shown in Figure 5.

In the present instance, the cord 39 is extended through the leg of the body 10, and around the guide pulley 41 or the like, and another guide pulley or the like 42, through the opening 43 to the saddle 11, forming at its upper end the bridle rein 12 already referred to.

It will, of course, be understood that one of the flexible devices 39 is connected with each rod 32.

I will now describe the practical operation of my amusement device.

Assuming that the parts are in the position illustrated in Figure 1 with the feet 22 free to operate, then when the body 10 is rocked backward and forward, it will be seen that on the forward rocking movement, one pair of the feet 22, (that is, one foot 22 on each rocker) will engage the floor and carry the device forward until the pair just ahead engage the floor. The remaining pairs of feet 22 will then consecutively advance the device step by step.

Similarly during the backward rocking movement, the device will be advanced step by step.

This forward movement may be continued as long as the rider desires.

If the rider desires to go backward, he pulls both reins 12 for thereby shifting the rods 32 forwardly against the tension of the springs 35 whereupon the shifters 27, will slide forwardly engaging the feet 22 and swinging them up close to the rockers to inoperative position.

At the same time, the feet 23 are allowed to drop down until the rear edges of the shifters 27 stand adjacent to the upper forward edges of the feet 23.

Then when the device is rocked, it will move rearwardly on both the forward and the backward rocking movements.

If the rider desires to turn around, he pulls on one only of the reins 12 whereupon one set of feet 22 and one set of feet 23 will become operative, and as the device is rocked, it will turn around, because one rocker will tend to move ahead and the other to move back.

The rockers are preferably connected at their forward and rear ends by cross bars 51 to give strength and rigidity to the device.

It should perhaps be mentioned that the springs 37 serve an additional function in that if the rods 32 are shifted when the rockers rest in such position that some of the feet rest on the floor so that they can not be moved, then some of the springs 37 will be compressed but the bars 26 connected with the feet which do not move, will not be adjusted.

As soon as the feet held on the floor are released by the rocking movement, the compressed springs 37 will cause the proper movement of the bars 26 for causing the feet 22 and 23 to be moved to the desired positions.

For purposes of clearer illustration, I have shown in Figure 4 a diagram illustrating the operation of the device in its advancing movement.

When the device starts on its forward rocking movement, the operative foot engages the floor at point P.

Referring now only to one foot shown in dotted lines at the right hand part of Figure 4, it will be seen that the pivot point P' of the operative foot swings in an arc of a circle indicated by the arrow R toward the point P'', carrying the device forwardly the distance indicated by the arrow D.

The advantages of a structure of the kind herein described, will be largely obvious from the foregoing description of the construction and operation.

The device is simple and affords exercise to children. It has the attractiveness of movement over the ground with little likelihood of injury to the rider.

Changes may be made in the arrangement of the parts of my improved device without departing from the real spirit and purpose of my invention and it is my intention to cover by my claims any modified forms of structure or use of mechanical equivalents which may be reasonably included within their scope.

I claim as my invention:

1. In a device of the class described, a body, a rocker structure for supporting the body, a series of walking feet pivoted to the rocker structure for permitting swinging movement, stops for limiting the swinging movement of said feet in one direction, means for engaging said feet to render them inoperative, said means comprising a rod slidably mounted, shifters slidably mounted on said rod and resilient means interposed between said rod and said shifters.

2. In a device of the class described, a body, a rocker structure for supporting the body, a series of walking feet pivoted to the rocker structure for permitting swinging movement, stops for limiting the swinging movement of said feet in one direction, a second series of walking feet pivoted to the rocker structure for permitting swinging movement, stops for limiting the swinging movement of the second feet in a direction opposite to that of the first feet, means for engaging said feet to render them inoperative, said means comprising a rod slidably mounted, shifters slidably mounted on said rod and resilient means interposed between said rod and said shifters whereby said shifters resiliently engage one series of feet when said rod is moved in one direction and the other series when the rod is moved in an opposite direction.

3. In a device of the class described, a rocker, a pair of series of feet pivoted thereto, stops for limiting the pivotal movement of one series of said feet in one direction and the other series in the other direction whereby one series depends from the rocker at an angle in one direction and the other series depends therefrom at an angle in the other direction, means for rendering one series of said feet inoperative while the other series is free for pivotal movement, said means comprising a slidably mounted rod, shifters slidably mounted thereon and adapted to engage either of said series of feet, resilient means for causing said shifters to move when said rod is slid.

KENNETH ARNET MATHERS.